US006954927B2

(12) United States Patent
Ostanevich

(10) Patent No.: US 6,954,927 B2
(45) Date of Patent: Oct. 11, 2005

(54) HARDWARE SUPPORTED SOFTWARE PIPELINED LOOP PROLOGUE OPTIMIZATION

(75) Inventor: Alexander Y. Ostanevich, Moscow (RU)

(73) Assignee: Elbrus International, Moscow (RU)

( * ) Notice: Subject to any disclaimer, the term of this patent is extended or adjusted under 35 U.S.C. 154(b) by 617 days.

(21) Appl. No.: 09/972,337

(22) Filed: Oct. 4, 2001

(65) Prior Publication Data

US 2002/0133813 A1 Sep. 19, 2002

Related U.S. Application Data

(63) Continuation-in-part of application No. 09/505,657, filed on Feb. 17, 2000.
(60) Provisional application No. 60/120,352, filed on Feb. 17, 1999, provisional application No. 60/120,360, filed on Feb. 17, 1999, provisional application No. 60/120,361, filed on Feb. 17, 1999, provisional application No. 60/120,450, filed on Feb. 17, 1999, provisional application No. 60/120,461, filed on Feb. 17, 1999, provisional application No. 60/120,464, filed on Feb. 17, 1999, provisional application No. 60/120,528, filed on Feb. 17, 1999, provisional application No. 60/120,530, filed on Feb. 17, 1999, and provisional application No. 60/120,533, filed on Feb. 17, 1999.

(51) Int. Cl.[7] .............................................. G06F 9/45
(52) U.S. Cl. .................. 717/160; 717/150; 717/153; 717/154; 712/4; 712/8; 712/241
(58) Field of Search .............................. 717/136–160; 712/4, 8, 241

(56) References Cited

U.S. PATENT DOCUMENTS

| | | | |
|---|---|---|---|
| 4,571,678 A | 2/1986 | Chaitin | |
| 4,782,444 A | 11/1988 | Munshi et al. | |
| 5,367,651 A * | 11/1994 | Smith et al. ................ | 717/149 |
| 5,404,473 A * | 4/1995 | Papworth et al. ........... | 712/241 |
| 5,437,035 A * | 7/1995 | Horiuchi et al. ............ | 717/149 |
| 5,889,985 A | 3/1999 | Babaian et al. | |
| 5,923,871 A | 7/1999 | Gorshtein et al. | |
| 5,958,048 A | 9/1999 | Babaian et al. | |
| 6,151,705 A * | 11/2000 | Santhanam .................. | 717/153 |
| 6,594,814 B1 * | 7/2003 | Jou et al. ...................... | 716/18 |
| 2002/0012228 A1 * | 1/2002 | Helder et al. | |

* cited by examiner

Primary Examiner—Tuan Dam
Assistant Examiner—Chuck Kendall
(74) Attorney, Agent, or Firm—Townsend and Townsend and Crew LLP

(57) ABSTRACT

A method for optimizing a software pipelineable loop in a software code is provided. The loop comprises one or more pipelined stages and one or more loop operations. The method comprises evaluating an initiation interval time (IN) for a pipelined stage of the loop. A loop operation time latency (Tld) and a number of loop operations (Np) from the pipelined stages to peel based on IN and Tld is then determined. The loop operation is peeled Np times and copied before the loop in the software code. A vector of registers is allocated and the results of the peeled loop operations and a result of an original loop operation is assigned to the vector of registers. Memory addresses for the results of the peeled loop operations and original loop operation are also assigned.

28 Claims, 5 Drawing Sheets

Schedule 200

Source code 102

```
int a[ 100 ], b[ 100 ];
int i;
for( i = 0; i < N; i++ ) {
        b[ i ]=a[ i ]+1;
}
```

| Pipeline | |
|---|---|
| S1 | 4 stages |
| II | 2 cycles | table 204

Execution Time
$T2=(N+3)*2$ diagram 202

HARDWARE SUPPORTED SOFTWARE PIPELINED LOOP PROLOGUE OPTIMIZATION

CROSS-REFERENCES TO RELATED APPLICATIONS

This application is Continuation-In-Part application which is related to and claims priority from U.S. patent application Ser. No. 09/505,657 filed Feb. 17, 2000 which claims priority from U.S. Provisional Patent Application Nos. 60/120,352; 60/120,360; 60/120,361; 60/120,450; 60/120,461; 60/120,464; 60/120,528; 60/120,530; and 60/120, 533, all of which were filed Feb. 17, 1999, the disclosures of which are incorporated herein by reference in their entirety.

BACKGROUND OF THE INVENTION

1. Field of the Invention

The present invention relates in general to computer processing and more specifically to a system and method for software optimization of loop regions in a software code.

2. Description of the Prior Art

Modern compilers perform a lot of optimizations related to loops, which are regularly repeated regions in a source program. Commonly known optimizations such as loop unrolling and software pipelining may be included in a loop optimization system. For example, in Explicit Parallel Instruction Computing (EPIC) architecture processors, software pipelining is very important for loop optimizations.

Software pipelining is a well known optimization technique typically applied to loops. Software pipelining extracts potential parallelism from adjacent iterations of the loop for pipelining. Unlike loop unrolling, processors such as an EPIC processor do not make a copy of several adjacent iterations of an original loop to achieve more parallel code. Rather, an iteration is broken into several pipeline stages, S, which are combined into a parallel kernel code. Thus, the kernel contains only a set of operations from the original loop iteration. By executing the kernel once, S adjacent iterations are concurrently advanced, but in different stages.

An Initiation Interval (IN) of pipeline stages may be expressed in target architecture clock cycles. When performing a pipelined loop kernel code, during every IN clock cycles, a process starts a new iteration (i), advances (i−1) . . . (i−S+1) iterations, and finalizes an (i−S) iteration. In order to execute one iteration of an initial loop, S stages or S*IN clock cycles are needed. Further, in order to execute two iterations—S+1 stages or (S+1)*IN clock cycles are needed and so on. In general, execution time of a pipelined loop is equal to (N+S−1)*IN clock cycles, where N is a repetition count of the original loop. When the repetition count is large, the most time is consumed by N*IN, but if the repetition count is small and a loop is frequently visited, then (S−1)*IN becomes significant.

FIG. 1 illustrates an example loop schedule 100 for a source code 102. As shown, source code 102 includes three loop operations. The operations include a memory read (Ld), an addition (Add), and a memory write (St) operation. A processor, such as an EPIC architecture processor, with one memory channel (MEM) and one arithmetic logic unit (ALU) channel may perform the loop. During each clock cycle, it is assumed the processor is able to perform two parallel operations, one memory access operation and one arithmetical operation. As shown in table 104, latencies for the operations are as follows: Ld-five clock cycles, Add-two clock cycles, and St-one clock cycle. Accordingly, without pipelining, each iteration of the loop requires eight clock cycles. That is, five clock cycles for the load operation, two clock cycles for the add operation, and one clock cycle for the store operation. Schedule 100 and diagram 108 illustrate the operations and latencies of the loop. Thus, full execution time is T1=8*N, where N is a loop repetition counter.

FIG. 2 illustrates a typical loop software pipelining optimization of source code 102. For discussion purposes, it is assumed the same resources used in FIG. 1 are used in FIG. 2. Using the loop software pipelining optimization method, schedule 200 and diagram 202 are produced. As shown in table 204, a pipeline includes S1=4 stages and an initiation interval of 2 cycles. Also, an execution time is T2=(N+S1−1)*IN=(N+3)*2, hereinafter described.

For the loop, the initiation interval (IN) is 2 clock cycles because the loop includes two memory access operations and there is only one memory channel in the processor. Accordingly, diagram 202 illustrates a load operation at the clock cycles of 0, 2, 4, and 6. Additionally, a store operation at clock cycle 5, an Add operation at clock cycle 5, a store operation at clock cycle 7, etc. are shown. The loop kernel includes clock cycle 6 and 7, where store, add, and load operations are performed. Thus, a loop kernel includes 4 pipeline stages, so S1 equals 4. Specifically, the kernel includes the store operation performed in clock cycle 7 of iteration 1, the add operation is performed in clock cycle 7 of iteration 2, and the load operation performed in clock cycle 6 of iteration 4. As discussed above, to perform N iterations of the original loop, a kernel is executed (N+S−1) times. In terms of clock cycles, the execution time, T2, is equal to (N+S1−1)*IN. Assuming S1 equals 4, T2=(N+4−1)*2=(N+3)*2. Therefore, where N=1, the execution time of T2 is similar to the execution time of T1. However, for all N>1, the execution time of T2 is faster than the execution time of T1.

BRIEF SUMMARY OF THE INVENTION

A method for optimizing a software pipelineable loop in a software code is provided in one embodiment of the present invention. In one embodiment, the loop comprises one or more pipelined stages and one or more loop operations. The method comprises evaluating an initiation interval time (IN) for a pipelined stage of the loop. A loop operation time latency (Tld) and a number of loop operations (Np) from the pipelined stages to peel based on IN and Tld is then determined.

The loop operation is peeled Np times and copied before the loop in the software code. A vector of registers is allocated and the results of the peeled loop operations and a result of an original loop operation is assigned to the vector of registers. Memory addresses for the results of the peeled loop operations and original loop operation are also assigned.

A further understanding of the major advantages of the invention herein may be realized by reference to the remaining portions of the specification in the attached drawings.

DETAILED DESCRIPTION OF THE INVENTION

In one embodiment, the present invention may be used in any processing system that includes parallel processing resources. For example, the Elbrus 2000 computing architecture designed by Elbrus is a computer architecture that provides suitable parallel processing resources for supporting the techniques of the present invention. This architecture is described in detail in, for example, U.S. Pat. No. 5,923,871 and is hereby incorporated by reference for all purposes.

According to an embodiment of the present invention, loop prologue optimization provides a method of software application speedup performed by an optimizing compiler that is targeted to generate code for parallel processor architectures, such as EPIC processors, and perform loop software pipelining. Modem EPIC processors include hardware for supporting loop pipelining: separate address arithmetic units, speculative and predicated execution modes of arithmetic and memory access operations, rotating registers and rotating predicate files, plural Arithmetic Logic Unit (ALU) channels, and memory access channels. These features may be used to obtain a kernel-only pipelined loop. Thus, pipeline filling and draining is performed by the same loop kernel code. However, architectures without specific hardware support for loop pipelining require the compiler to build separate prologue code for pipeline filling, loop kernel code for performing the loop after pipeline is full, and separate epilogue code to perform the rest of loop when the pipeline is draining.

Figure 1:
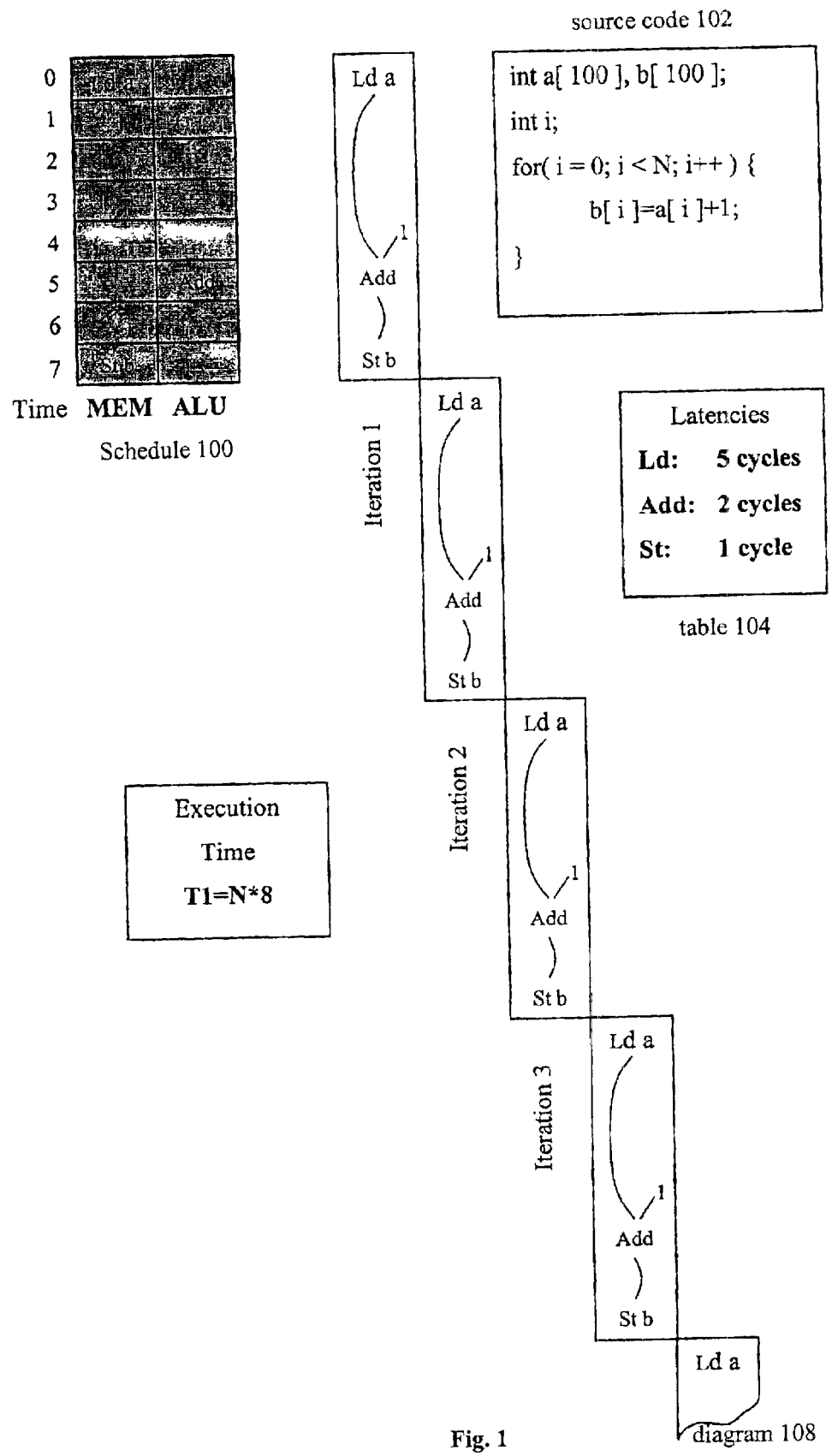
FIG. 1 illustrates a sample loop to illustrate the optimization method.
Figure 2:
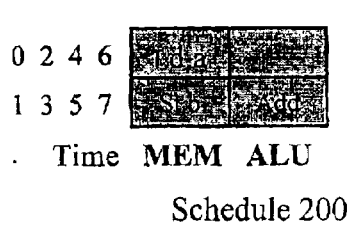
FIG. 2 illustrates a sample loop after pipelining.
Figure 2:
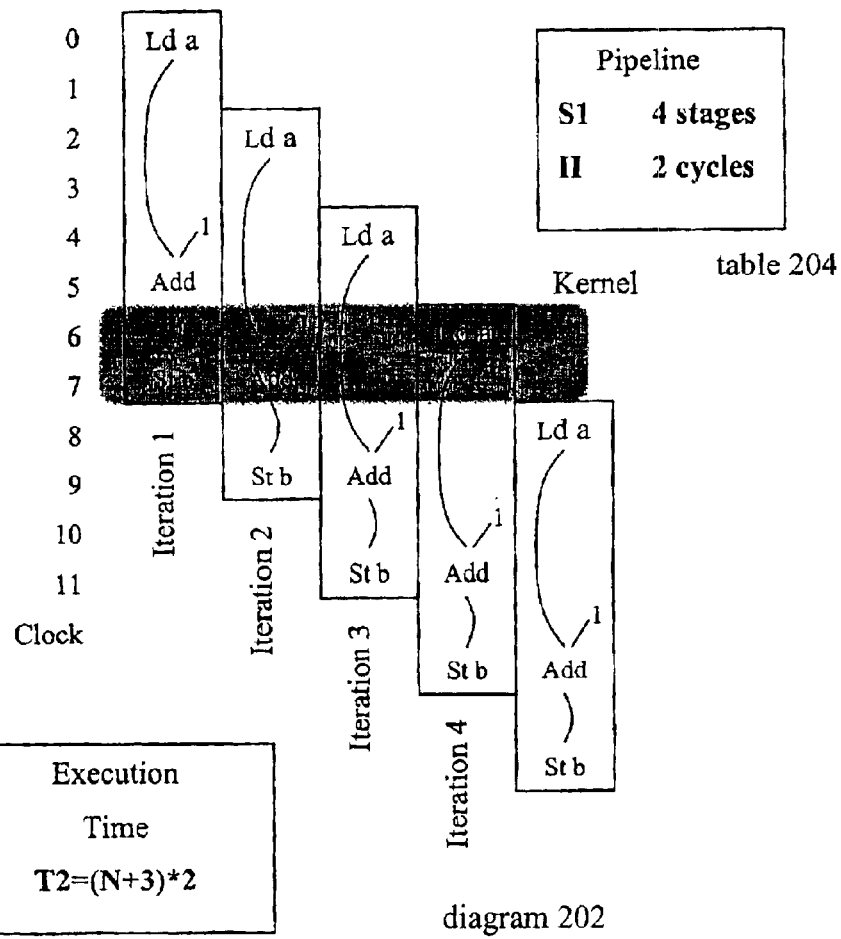
Figure 3:
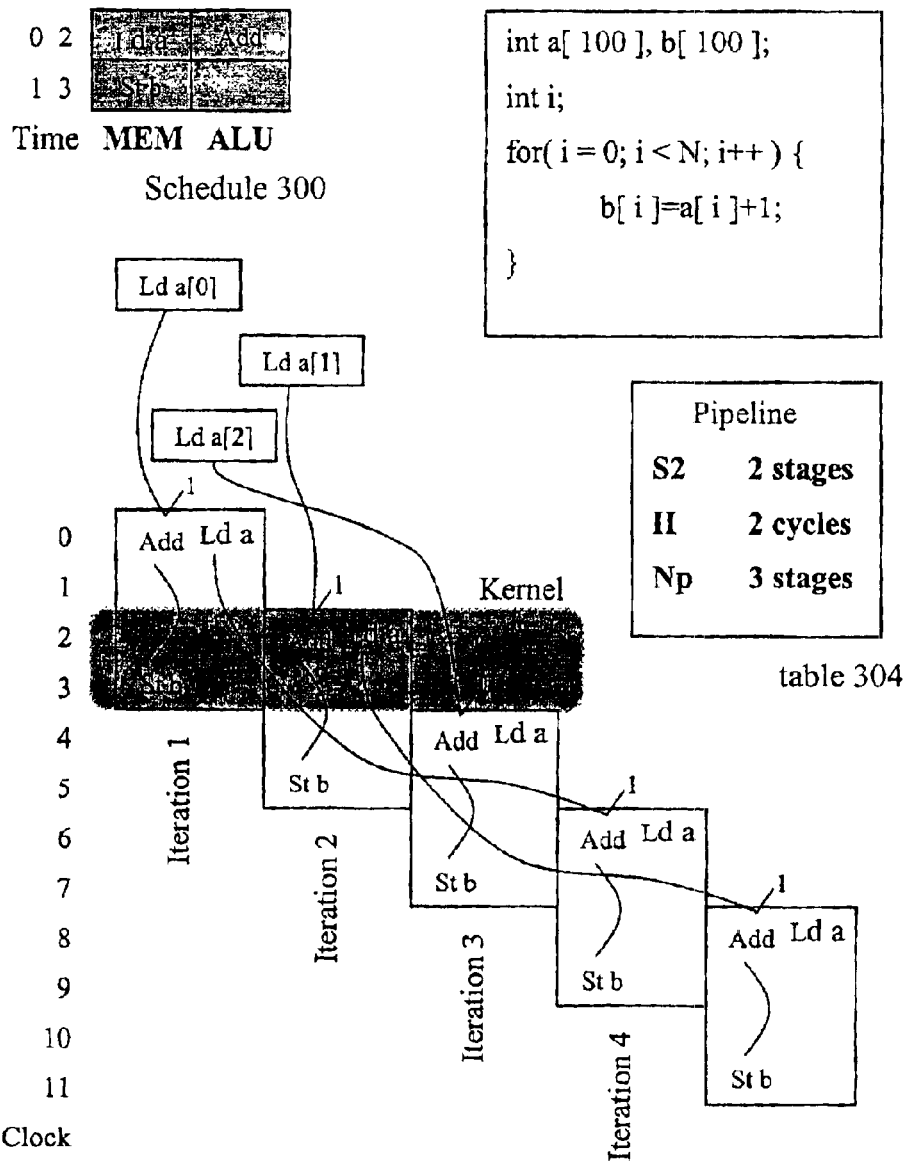
FIG. 3 illustrates a sample loop after a loop prologue optimization and pipelining according to one embodiment.

FIG. 3 illustrates an optimization of source code 102 according to one embodiment of the invention. For discussion purposes, it is assumed the same resources used in FIGS. 1 and 2 are used in FIG. 3. However, the resources used are not limited to the resources described and a person of skill in the art will appreciate other usable resources. The optimization takes into account that half of the pipelined stages are inserted due to a long latency time of the memory load operation in the loop. Thus, the number of stages in the pipeline may be reduced by peeling memory loads from several adjacent iterations of the loop. Effectively, the loop prologue appears to be partially peeled from the total execution time T1.

As shown, schedule 300 and diagram 302 may be produced by the optimization. As shown, table 304 shows S2=two stages, IN=two cycles, and a number of stages peeled, Np=three stages. Also, execution time 306 shows an execution time T3=(N+S2−1)*IN=(N+1)*2, hereinafter described.

Diagram 302 illustrates a pipelining optimization where memory loads have been peeled according to one embodiment. In order to perform the optimization, the following transformation steps may be performed by an optimizing compiler before common loop pipelining optimization is performed according to one embodiment. For example, the following steps may be performed:

evaluate a time of one stage of the loop pipeline IN;

establish a typical memory read access time, Tld, defined by the target architecture;

determine a number of pipeline stages, Np, to be peeled off. In one embodiment, Np is defined by (Tld+IN−1)/IN;

for each memory read access operation in the loop:

build a memory access load operation Np times in a software code. In one embodiment, the memory access load operation is built in an intermediate representation of a basic block preceding the loop body. An intermediate representation is a schematic basis (a model of the source program) for all further optimizations and code generation. The intermediate representation may be broken into basic blocks, which are blocks of straight forward code without branches. The basic blocks may then be optimized;

allocate a vector of adjacent rotating registers of the length Np+1: VR[0] . . . VR[Np]

assign destination registers of peeled memory load operations accordingly to VR[Np] . . . VR[1];

adjust effective memory address of the peeled loads so that Ld a[0]→VR[Np], Ld a[1]→VR[Np−1], . . . , Ld a[Np−1]→VR[1];

assign a destination register of the original memory load operation in the loop to Ld a[i]→VR[0]; and adjust effective memory address of the original load operation in the loop to the i+Np iteration: Ld a[i]→Ld a[i+Np].

After these transformations, the peeled loads are combined into the basic block preceding the loop body and thus, peeled prologue loop operation latencies are hidden. As shown in diagram 302, the transformed loop after pipelining has only two stages, S2=2, and IN=2 clock cycles. Assuming a memory assess time of Tld=5, the number of pipeline stages Np=(Tld+IN−1)/IN=(5+2−1)/2=6/2=3. Thus, three memory load operations are peeled. As shown in diagram 302, Ld a[0], Ld a[1], and Ld a[2] represent the three peeled loads. Ld a[0] corresponds to the add operation in clock cycle 0, Ld a[1] corresponds to the add operation in clock cycle 2, and Ld a[2] corresponds to the add operation in clock cycle 4. Additionally, the load operation in clock cycle 0 corresponds to the add operation in clock cycle 6 and load operation in clock cycle 2 corresponds to the add operation in clock cycle 8, and so on. Thus, three memory load operations were peeled for the add operations in clock cycles 0, 2, and 4.

Therefore, to perform N iterations, N+S2−1 repetitions of the optimized loop kernel are needed. Thus, execution time T3=(N+S2−1)*IN=(N+1)*2. An acceleration may be calculated between times T3 and T2. In general, acceleration is equal to A=T3/T2=(N+S2−1)*IN/(N+S1−1)*IN. After canceling the IN variables, acceleration is equal to (N+S2−1)/(N+S1−1). The variable S1 may be added and subtracted in the numerator where A=((N+S1−1)+S2−S1)/(N+S1−1)=1−(S1−S2)/(N+S1−1). Thus the speedup factor (S1−S2)/(N+S1−1) illustrates how much time the ratio, T3/T2, differs from one. The greater the difference in the pipeline stages (S1−S2) between the original software pipeline (S1) and the optimized pipeline (S2), the greater the speedup. However, the bigger the repetition counter (N), the speedup becomes less. Thus, acceleration is in forward dependence from the difference S1−S2 and in backward dependence from N. Therefore, the optimization is important for loops with relatively small repetition counters.

Figure 4:
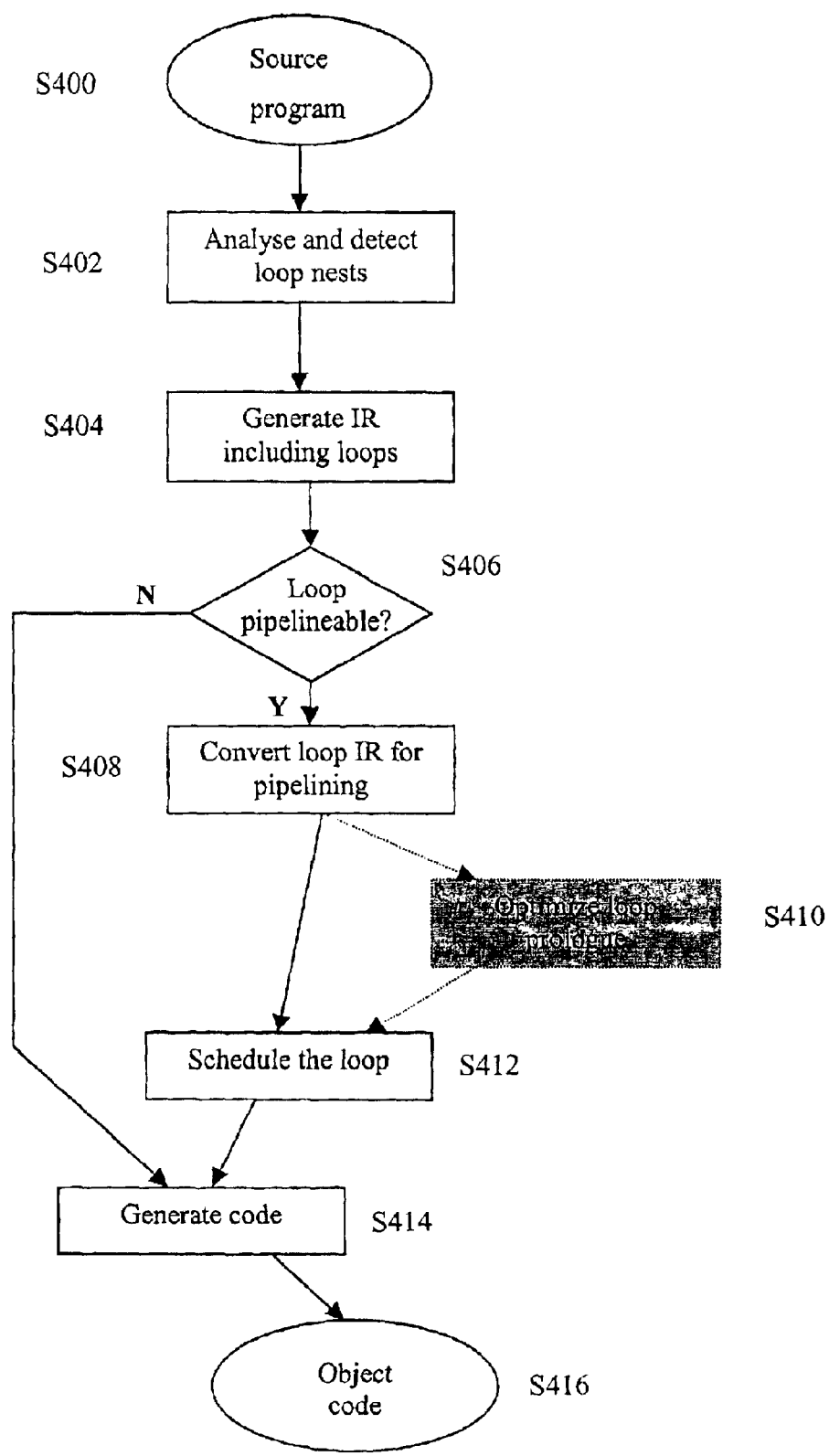
FIG. 4 illustrates a flowchart of an optimizing compiler implementing loop prologue optimization algorithm according to one embodiment.

FIG. 4 illustrates a simplified compilation scheme of an optimizing compiler able to perform software loop pipelining according to one embodiment. In step S400, a source program is produced. In step S402, the source program is analyzed. Analysis includes, for example, detecting loops, dependencies, and collecting all needed information about the source program.

In step S404, the compiler builds an intermediate representation of the source program including all the detected loops. Any methods known in the art for building an intermediate representation may be used.

In step S406, the process determines if the loop is pipelineable. The decision whether to pipeline the loop or not is made based on the previous loop analysis. If the loop is not pipelineable, the process proceeds to step S414, where code is generated.

If the loop is pipelineable, the optimizing compiler performs loop pipelining optimization. In one embodiment, the loop pipelining optimization may include, in step S408, converting the loop intermediate representation to a pipeline specific form. Additionally, in step S410, optimization of the loop prologue may be performed (hereinafter described). In step S412, the loop is scheduled.

After scheduling of the loop, code generation is performed to generate object code of the source program (step S414). In step S416, object code is generated including the pipelined loop kernel.

Figure 5:
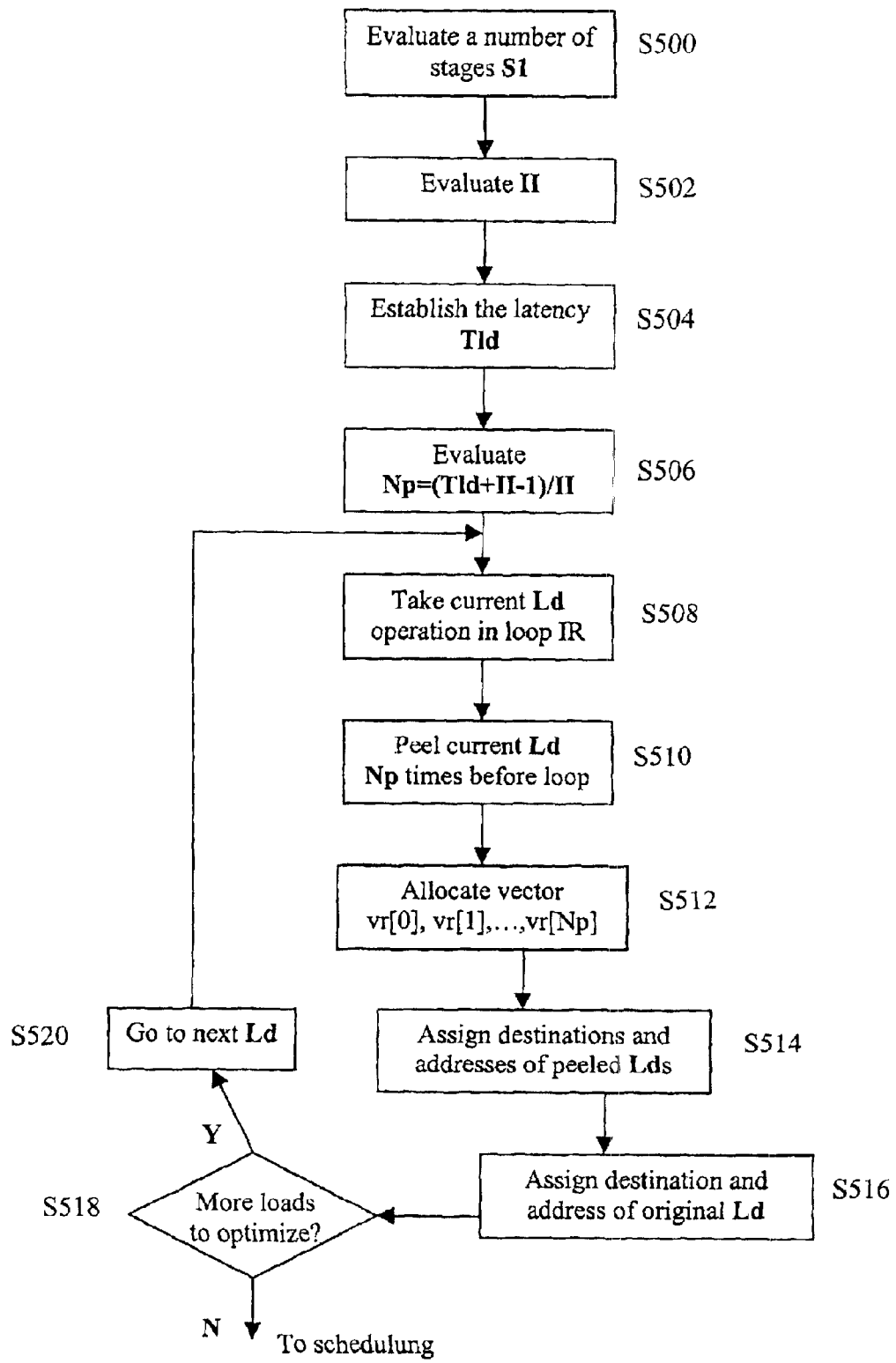
FIG. 5 illustrates a flowchart of an optimization algorithm according to one embodiment.

FIG. 5 illustrates the loop prologue optimization step of FIG. 4 in more detail according to one embodiment. In one embodiment, loop prologue optimization is applied to the loop intermediate representation before general software pipelining optimization is performed. In step S500, a number of loop pipelined stages S1, is determined as if the loops were pipelined. In step S502, an initiation interval of the loop is evaluated and determined. In step S504, a latency of a memory access operation, Tld, is established. The latency Tld is then used to evaluate the number of stages that may be peeled from the loop prologue. For example, the number of peeled stages are: Np=(Tld+IN−1)/IN.

In one embodiment, steps S508–S520 are applied iteratively to all memory loads in the loop IR. In step S508, a current Ld operation in the loop IR is identified. In step S510, the current Ld is peeled Np times and copied to a basic block preceding the loop body. The number of copies is equal to Np.

In step S512, the peeled loads are allocated to a vector of rotating registers VR[ ], which keep the results of all peeled loads as well as the original load remaining in the loop. The number of elements in the vector is equal to Np+1.

In step S514, destination registers of the peeled loads are assigned to elements of the vector. For example, the first peeled load is assigned the destination of VR[Np] and corresponds to the first iteration of the loop, the second load is assigned the destination of VR[Np−1] and corresponds to the second iteration of the loop, and so on. The last peeled load is assigned the destination in VR[1] and corresponds to the Np iteration of the original loop.

In one embodiment, the order of VR elements is in reverse relative to the order of Load peels because of register rotation. Rotatable registers are addressed in hardware indirectly via a current Base (B) and a constant displacement [I], which is a number of a particular vector element. Rotatable registers are organized as an area of Np registers. Every initiation interval, the Base is moved to point to an adjacent element in the vector, for example, B=((B−1) mod Np). If some vector element is addressed as VR[I], it's real absolute address may be calculated as ((B+I) mod Np). In one embodiment, the address calculations are performed at run time in the hardware when the operations are executed and the registers are accessed. The compiler deals with static displacements and hence relative register addresses and not absolute. For instance, VR[2] is addressed as VR[3] after a Base move and as VR[4] after two Base moves. In these conditions if the result value of some Ld operation occupies some VR[J] element, then VR[J+1] is occupied by the Ld from the previous loop iteration.

The following table illustrates an example allocation just before the loop kernel is executed a first time. Three peeled Load operations have already been performed and the original loop Load has not been performed yet:

| VR | 0 | 1 | 2 | 3 |
|----|---|---|---|---|
| Ld |   | a[2] | a[1] | a[0] |

As shown, the three peeled loads, a[0], a[1], and a[2] are represented in vectors, VR[3], VR[2], and VR[1] respectively.

Also, a destination register is assigned for the initial load operation of the original loop. The destination is the VR[0] register. As shown, because Np loads are peeled before the loop, the load in the pipelined loop body now corresponds to the Np+1 iteration of the original loop. The next table illustrates the vector elements after the first loop kernel trip (but before the Base move):

| VR | 0 | 1 | 2 | 3 |
|----|---|---|---|---|
| Ld | a[3] | a[2] | a[1] | a[0] |

The base is moved within the rotated area each time the loop kernel is performed. Thus, the second kernel trip starts with new names of the same vector elements:

| VR | 1 | 2 | 3 | 0 |
|----|---|---|---|---|
| Ld | a[3] | a[2] | a[1] | a[0] |

Now VR[0] is ready to be occupied by the next Ld operation result of the next loop iteration because the value a[0] is already used by the appropriate Add operation in iteration 1. After the second loop kernel trip is over, the table looks like:

| VR | 1 | 2 | 3 | 0 |
|----|---|---|---|---|
| Ld | a[3] | a[2] | a[1] | a[4] |

Ld a[4] corresponds to the load performed in iteration 1.

Additionally, memory access addresses are adjusted for the peeled loads where Ld a[0]→VR[Np], Ld a[1]→VR[Np−1], . . . , Ld a[Np−1]→VR[1].

Additionally, the memory access address for the original loop load is adjusted to Ld a(i+Np)→VR[0].

In step S518, the process determines if there are more loads to optimize. If so, the process proceeds to the next Ld operation (step S520) and proceeds back to step S508 and iterates to the next load operation in the IR. If not, the process proceeds to scheduling (step S412) of FIG. 4.

The above description is illustrative but not restrictive. Many variations of the invention will become apparent to those skilled in the art upon review of this disclosure. The scope of the invention should, therefore, be determined not with reference to the above description, but instead should be determined with reference to the pending claims along with their full scope or equivalents.

What is claimed is:

1. A method for optimizing a software pipelineable loop in a software code, wherein the loop comprises one or more pipelined stages and one or more loop operations, the method comprising:
   (a) evaluating an initiation interval time (IN) for a pipelined stage of the loop;
   (b) determining a loop operation time latency (Tld);
   (c) determining a number of loop operations (Np) from the pipelined stages to peel based on IN and Tld;
   (d) peeling Np copies of the loop operation, wherein the number of peeled loop operations equals (Tld+IN−1)/IN;
   (e) copying the peeled loop operations before the loop in the software code;
   (f) allocating a vector of registers;
   (g) assigning results of the peeled loop operations and a result of an original loop operation to the vector of registers; and
   (h) assigning memory addresses to the results of the peeled loop operations and original loop operation.

2. The method of claim 1, wherein the initiation interval time comprises a number clock cycles for a number of stages required to execute a loop kernel.

3. The method of claim 1, wherein the one or more loop operations comprises one or more load operations.

4. The method of claim 3, wherein steps (d)–(h) are repeated for every load operation.

5. The method of claim 1, wherein the vector of registers is a length of Np+1.

6. The method of claim 1, further comprising generating a software code based on the optimization.

7. The method of claim 1, wherein allocating a vector of registers comprises allocating a vector of registers with a rotating Base.

8. An apparatus for optimizing a software pipelineable loop in a software code, wherein the loop comprises one or more pipelined stages and one or more loop operations, the apparatus comprising:
   (a) instructions for evaluating an initiation interval time (IN) for a pipelined stage of the loop;
   (b) instructions for determining a loop operation time latency (Tld);
   (c) instructions for determining a number of loop operations from the pipelined stages to peel (Np) based on the IN and Tld;
   (d) instructions for peeling Np copies of the loop operation, wherein the number of peeled loop operations equals (Tld+IN−1)/IN;
   (e) instructions for copying the peeled loop operations before the loop in the software code;
   (f) instructions for allocating a vector of registers;
   (g) instructions for assigning results of the peeled loop operations and a result of an original loop operation to the vector of registers; and
   (h) instructions for assigning memory addresses to the results of the peeled loop operations and original loop operation.

9. The apparatus of claim 8, wherein the initiation interval time comprises a number clock cycles for a number of stages required to execute a loop kernel.

10. The apparatus of claim 8, wherein the one or more loop operations comprises one or more load operations.

11. The apparatus of claim 10, wherein steps (d)–(h) are repeated for every load operation.

12. The apparatus of claim 8, wherein the vector of registers is a length of Np+1.

13. The apparatus of claim 8, further comprising instructions for generating a software code based on the optimization.

14. The apparatus of claim 8, wherein the instructions for allocating a vector of registers comprises instructions for allocating a vector of registers with a rotating Base.

15. A method for optimizing a software pipelineable loop in a software code, wherein the loop comprises one or more pipelined stages and one or more loop operations, the method comprising:
   (a) evaluating an initiation interval time (IN) for a pipelined stage of the loop;
   (b) determining a loop operation time latency (Tld);
   (c) determining a number of loop operations (Np) from the pipelined stages to peel based on IN and Tld;
   (d) peeling Np copies of the loop operation;
   (e) copying the peeled loop operations before the loop in the software code;
   (f) allocating a vector of registers, wherein the vector of registers is a length of Np+1;
   (g) assigning results of the peeled loop operations and a result of an original loop operation to the vector of registers; and
   (h) assigning memory addresses to the results of the peeled loop operations and original loop operation.

16. The method of claim 15, wherein the initiation interval time comprises a number clock cycles for a number of stages required to execute a loop kernel.

17. The method of claim 15, wherein the one or more loop operations comprises one or more load operations.

18. The method of claim 17, wherein steps (d)–(h) are repeated for every load operation.

19. The method of claim 15, wherein the number of peeled loop operations equals (Tld+IN−1)/IN.

20. The method of claim 15, further comprising generating a software code based on the optimization.

21. The method of claim 15, wherein allocating a vector of registers comprises allocating a vector of registers with a rotating Base.

22. An apparatus for optimizing a software pipelineable loop in a software code, wherein the loop comprises one or more pipelined stages and one or more loop operations, the method comprising:
   (a) instructions for evaluating an initiation interval time (IN) for a pipelined stage of the loop;
   (b) instructions for determining a loop operation time latency (Tld);
   (c) instructions for determining a number of loop operations (Np) from the pipelined stages to peel based on IN and Tld;
   (d) instructions for peeling Np copies of the loop operation;
   (e) instructions for copying the peeled loop operations before the loop in the software code;
   (f) instructions for allocating a vector of registers, wherein the vector of registers is a length of Np+1;
   (g) instructions for assigning results of the peeled loop operations and a result of an original loop operation to the vector of registers; and
   (h) instructions for assigning memory addresses to the results of the peeled loop operations and original loop operation.

23. The apparatus of claim 22, wherein the initiation interval time comprises a number clock cycles for a number of stages required to execute a loop kernel.

24. The apparatus of claim 22, wherein the one or more loop operations comprises one or more load operations.

25. The apparatus of claim 24, wherein steps (d)–(h) are repeated for every load operation.

26. The apparatus of claim 22, wherein the number of peeled loop operations equals (Tld+IN−1)/IN.

27. The apparatus of claim 22, further comprising instructions for generating a software code based on the optimization.

28. The apparatus of claim 22, wherein the instructions for allocating a vector of registers comprises instructions for allocating a vector of registers with a rotating Base.

* * * * *